Feb. 13, 1923.
F. DE L. CATS.
AIR SPRING.
FILED DEC. 13, 1921.
1,445,486.
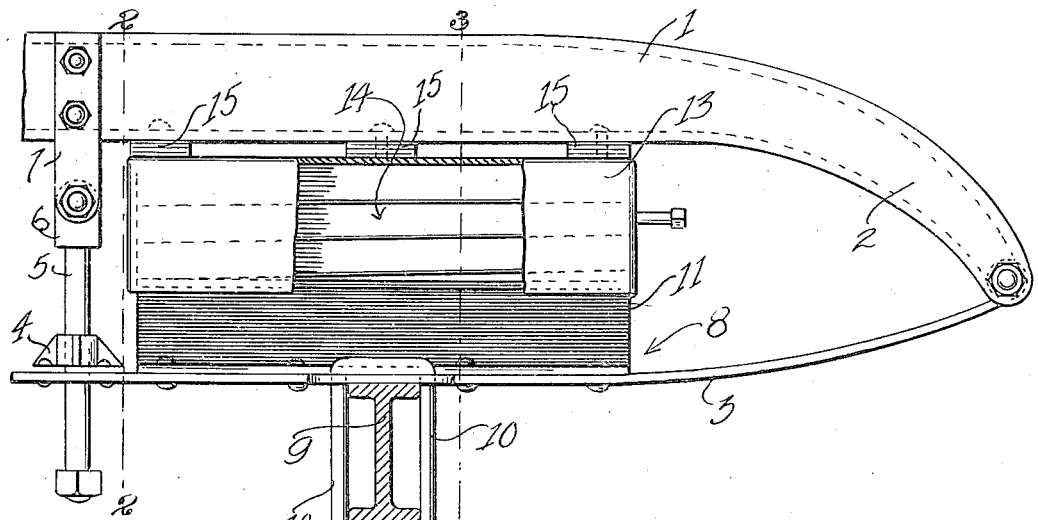
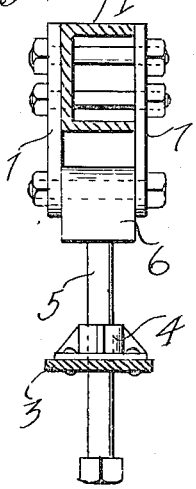
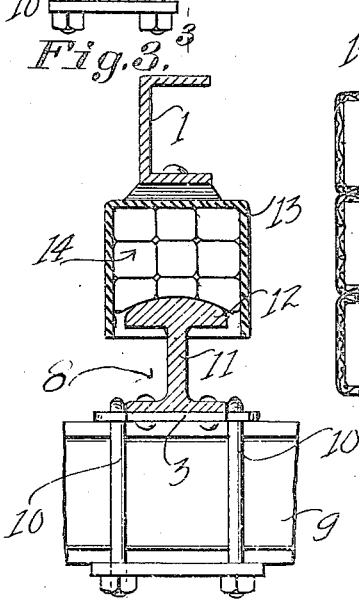
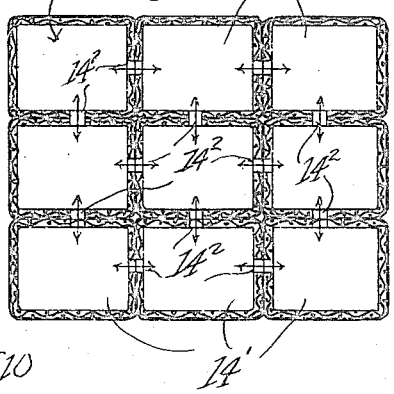
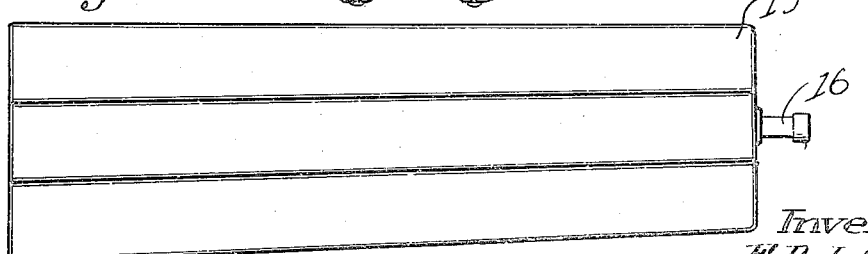
Inventor,
F. De L. Cats
By Victor J. Evans
Attorney Patented Feb. 13, 1923.

1,445,486

UNITED STATES PATENT OFFICE.

FREDERICK DE L. CATS, OF BISHOP, CALIFORNIA.

AIR SPRING.

Application filed December 13, 1921. Serial No. 522,005.

*To all whom it may concern:*

Be it known that I, FREDERICK DE L. CATS, a citizen of the United States, residing at Bishop, in the county of Inyo and State of California, have invented new and useful Improvements in Air Springs, of which the following is a specification.

My invention relates to an improved air spring for automobiles and its object is to provide a simple and cheap device for absorbing the shock of an automobile and taking the place of the ordinary leaf spring.

Owing to its unusual practical construction the air spring may be used on vehicles in general and is not necessarily limited to automoblies although its most extensive use will no doubt be in the automobile industry on every make of automobile.

Other objects and advantages will be apparent during the course of the following description.

In the accompanying drawings forming a part of this specification, and in which like numerals are employed to designate like parts throughout the same, Fig. 1 is a side view of my invention in use, Fig. 2 is a view on the line 2—2 of Fig. 1, Fig. 3 is a view on the line 3—3 of Fig 1, Fig. 4 is an enlarged view of the air cushion.

Fig. 5 is a top view of the air cushion housing,

In the accompanying drawings wherein for the purpose of illustration is shown a preferred embodiment of my invention, the numeral 1 is the automobile frame and 3 is the spring steel truss which is connected to the downwardly curved end 2 of the frame and extends rearward parallel of the frame with its opposite end connected to a guide collar 4 through which the rod 5 passes. The upper end of the rod carries a bumper 6 and is fastened between the suspension straps 7 which in turn straddle the frame 1 and is securely fixed thereto by bolts or the like. The opposite end of the rod extends below the spring steel truss so that the collar is free to slide up and down when the distance between the truss and the frame is changed when going over a bump or other unevenness in the road surface.

Fixed to the truss 3 is an H-beam 8 and the truss is also strapped to the axle 9 by suitable means 10. The H-beam 8 is relatively long and has a web 11 and a T-head 12 which is confined between the downwardly extending sides of housing 13 for the air cushion 14. The top of the housing 13 is fixed to the underside of the frame by blocks and bolts 15.

The air cushion 14 may be made of a series of air bags 14' with rubber or fabric material used to give the required compressible quality to the same, or may be made as a single air cushion or bag having one compartment or a plurality of separate compartments. For the purpose of simplifying the construction, I have illustrated the air cushion as being made of a series of separate bags 14', all of the separate air bags being connected by openings $14^2$ to circulate the air when the cushion is compressed. Several bags may also be filled through the valved air intake 16.

The cushion should have a slant, as shown in Fig. 1, and when it is confined in the housing 13 with the T-head 12 pressing against its underside (see Fig. 3) all shocks of the vehicle will be absorbed by the cushion and the vehicle will ride unusually easy.

The rod 5 acts as a guide for one end of the spring and the pivotal connection of the spring steel truss 3 with the frame holds that particular end in proper alignment.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a vehicle spring of the class described, an air cushion adapted to be mounted beneath the vehicle frame, a spring steel truss having a yielding connection at its forward end to the frame end, and with its opposite end guided by a rod suspended from the frame, means for mounting said truss to the vehicle axle, means mounted upon said truss having a T-head adapted to bear against the underside of the air cushion, a housing surrounding the air cushion and into which said T-head extends, said housing comprising a box-like enclosure having an open underside made to receive said T-head and the T-head having a dimension of substantially that of the width and length of the housing.

2. In a vehicle spring of the class described, an air cushion adapted to be mounted beneath the vehicle frame, a spring steel truss having a yielding connection at its forward end to the frame end, and with its opposite end guided by a rod suspended from the frame, means for mounting said truss to the vehicle axle, and means mounted upon the truss having a T-head adapted to bear against the underside of the air cushion, a housing surrounding the air cushion and into which said T-head extends, said air cushions comprising a series of air bags each connected by an opening from one to another, and a single valve filling intake for all of the bags.

3. In a vehicle spring of the class described, an air cushion adapted to be mounted beneath the vehicle frame, a spring steel truss having a yielding connection at its forward end to the frame end, and with its opposite end guided by a rod suspended from the frame, means for mounting said truss to the vehicle axle, means mounted upon said truss having a T-head adapted to bear against the underside of the air cushion, a housing surrounding the air cushion and into which said T-head extends, said housing comprising a box-like enclosure having an open underside made to receive said T-head and the T-head having a dimension of substantially that of the width and length of the housing, said air cushioon comprising a series of air bags each connected by an opening from one to another, and a single valve filling intake for all of the bags.

4. In a vehicle spring of the class described, an air cushion adapted to be mounted beneath the vehicle frame, a spring steel truss having a yielding connection at its forward end to the frame end, and with its opposite end guided by a rod suspended from the frame, means for mounting said truss to the vehicle axle, and means mounted upon the truss having a T-head adapted to bear against the underside of the air cushion, a housing surrounding the air cushion and into which said T-head extends, said air cushion comprising a series of square air bags made from rubber and fabric material, openings inter-connecting the bags and a single filling intake for all of the bags.

5. In a vehicle spring of the class described, an air cushion adapted to be mounted beneath the vehicle frame, a spring steel truss having a yielding connection at its forward end to the frame end, and with its opposite end guided by a rod suspended from the frame, means for mounting said truss to the vehicle axle, means mounted upon said truss having a T-head adapted to bear against the underside of the air cushion, a housing surrounding the air cushion and into which said T-head extends, said housing comprising a box-like enclosure having an open underside made to receive said T-head and the T-head having a dimension of substantially that of the width and length space of the housing, said air cushion comprising a series of square air bags made from rubber and fabric material, openings inter-connecting the bags and a single filling intake for all of the bags.

6. In a device of the class described, an air cushion adapted to be mounted beneath a vehicle frame and a yielding truss structure mounted upon the vehicle axle parallel with the frame and connected thereto at its respective ends, an elongated H-shaped compression means carried upon the truss structure and having a T-head adapted to bear against the underside of the air cushion and a housing for the air cushion having a width and length of substantially that of the said T-head and adapted to receive said T-head to hold the same in contact with the cushion.

7. In a device of the class described, an air cushion adapted to be mounted beneath a vehicle frame and a yielding truss structure mounted upon the vehicle axle parallel with the frame and connected thereto at its respective ends, an elongated H-shaped compression means carried upon the truss structure and having a T-head adapted to bear against the underside of the air cushion and a housing for the air cushion having a width and length of substantially that of the said T-head and adapted to receive said T-head to hold the same in contact with the cushion, said air cushion comprising a series of air bags each connected by an opening from one to another and a single valve filling intake for all of the bags.

8. In a device of the class described, an air cushion adapted to be mounted beneath a vehicle frame and a yielding truss structure mounted upon the vehicle axle parallel with the frame and connected thereto at its respective ends, an elongated H-shaped compression means carried upon the truss structure and having a T-head adapted to bear against the underside of the air cushion and a housing for the air cushion having a width and length of substantially that of the said T-head and adapted to receive said T-head to hold the same in contact with the cushion, said air cushion comprising a series of square air bags made from rubber and fabric material, openings inter-connecting the bags and a single filling intake for all of the bags.

9. In a device of the class described, an air cushion adapted to be mounted beneath a vehicle frame and a yielding truss structure mounted upon the vehicle axle parallel with the frame and connected thereto at its respective ends, an elongated H-shaped compression means carried upon the truss structure and having a T-head adapted to bear against the underside of the air cushion and a housing for the air cushion having a width and length of substantially that of the said T-head and adapted to receive said T-head to hold the same in contact with the cushion, said air cushion having a rearwardly slanting bottom with the said T-head normally contacting only with its rear surface.

In testimony whereof I affix my signature.

FREDERICK DE L. CATS.